United States Patent
Teal

(10) Patent No.: US 6,785,821 B1
(45) Date of Patent: *Aug. 31, 2004

(54) INTRUSION DETECTION SYSTEM AND METHOD HAVING DYNAMICALLY LOADED SIGNATURES

(75) Inventor: Daniel M. Teal, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/288,660

(22) Filed: Nov. 4, 2002

Related U.S. Application Data

(63) Continuation of application No. 09/227,987, filed on Jan. 8, 1999, now Pat. No. 6,477,651.

(51) Int. Cl.[7] ................................ H04L 9/00
(52) U.S. Cl. ...................... 713/200; 709/223; 709/224; 709/331
(58) Field of Search ................... 713/200, 201, 713/165, 167, 176, 189; 709/223–224, 331; 380/201, 229, 239, 42, 277

(56) References Cited

U.S. PATENT DOCUMENTS

| | | | |
|---|---|---|---|
| 5,032,979 A | 7/1991 | Hecht et al. ............... 364/200 |
| 5,101,402 A | 3/1992 | Chiu et al. .................... 370/17 |
| 5,278,901 A | 1/1994 | Shieh et al. ................... 380/4 |
| 5,414,833 A | 5/1995 | Hershey et al. ............. 395/575 |
| 5,448,724 A | 9/1995 | Hayashi | |
| 5,488,715 A | 1/1996 | Wainwright ........... 395/182.02 |
| 5,524,238 A | 6/1996 | Miller et al. ................ 395/600 |
| 5,557,742 A | * 9/1996 | Smaha et al. | |
| 5,606,668 A | 2/1997 | Shwed .................. 395/200.11 |
| 5,621,889 A | 4/1997 | Lermuzeaux et al. ....... 395/186 |
| 5,699,513 A | 12/1997 | Feigen et al. .......... 395/187.01 |
| 5,793,763 A | 8/1998 | Mayes et al. ............... 370/389 |
| 5,796,942 A | 8/1998 | Esbensen | |
| 5,798,706 A | 8/1998 | Kraemer et al. ....... 340/825.07 |
| 5,805,801 A | 9/1998 | Holloway et al. ..... 395/187.01 |
| 5,826,014 A | 10/1998 | Coley et al. ........... 395/187.01 |
| 5,892,904 A | * 4/1999 | Atkinson et al. ...... 395/187.01 |
| 5,919,257 A | 7/1999 | Trostle ....................... 713/200 |
| 5,931,946 A | 8/1999 | Terada et al. ............... 713/201 |
| 5,991,881 A | 11/1999 | Conklin et al. ............. 713/201 |
| 6,029,256 A | * 2/2000 | Kouznetsov ................. 714/38 |
| 6,134,664 A | * 10/2000 | Walker ....................... 713/200 |
| 6,272,641 B1 | * 8/2001 | Ji ............................... 713/201 |
| 6,275,942 B1 | * 8/2001 | Bernhard et al. ........... 713/201 |
| 6,298,445 B1 | 10/2001 | Shostack et al. ............ 713/201 |
| 6,321,338 B1 | 11/2001 | Porras et al. ............... 713/201 |

OTHER PUBLICATIONS

"Preliminary Report on Advance Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

(List continued on next page.)

Primary Examiner—Kim Vu
Assistant Examiner—Leynna Ha
(74) Attorney, Agent, or Firm—Baker Botts L.L.P.

(57) ABSTRACT

An intrusion detection system and method for detecting unauthorized or malicious use of network resources includes an intrusion detection analysis engine that instanciates one or more analysis objects to detect signatures associated with attacks on network vulnerabilities. As new network vulnerabilities are identified, new analysis objects can be dynamically interfaced on a runtime basis with the intrusion detection analysis engine to detect signatures associated with the new network vulnerabilities. A signature application programming interface supports communication between the intrusion detection analysis engine and the analysis objects. When the instance of an analysis object indicates that an associated signature exists in network data, the intrusion detection analysis engine can provide an alarm.

37 Claims, 1 Drawing Sheet

OTHER PUBLICATIONS

"An Introduction to Intrusion Detection," A. Sundaram, pp. 1–10, (found at http://www.cs.purdue.edu/coast/archive/data/categ24.html).

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html).

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Illgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/catag30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16., (found at http://www.cs.purdue.edu/coast/archive/data/categ30.html).

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages., (found at http://www.cs.purdue.edu/coast/archive/data/categ30.html).

"Characteristics of Wide–Area TCP/IP Conversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the the 14th National Computer Security Conference*, Oct. 1991, pp. 362–371., (found at http://seclab.cs.ucdavis.edu/papers.html.), 1991.

"Internetwork Security Monitor: An Intrusion–Detection System for Large–Scale Networks", L.T. Heberlein et al., *Proc. of the 15th National Computer Security Conference*, Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2, 1999*, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers.html.), Oct. 17, 1998.

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Devanbu eta l., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Tip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System",. Yip et al., *Proceedings of the Twelfth Annual IFIP WG 11.3 Working Conference on Database Security*, Chalkidiki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.), Mar. 13, 1997.

"Information Survivability, and Fault Tolerance", Matt Bishop, position paper for the Information Survivability Workshop *Journal of Computer Security #6*) 1 page, (found at http://seclab.cs.ucdavis.edu/papers.html.), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. new Security Paradigms Workshop*, Cumbria, UK 13 pages, (found at http://seclab.cs.ucdavis.edu/papers.html.), 1997.

"An Efficient Message Authentication Scheme for Link Routing", S. Cheung, *Proc. 13th annual Computer Security Applications Conference*, San Diego, CA, 9 pages, (found at http://seclab.cs.ucdavis.edu/papers.html.), 1997.

"Cryptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html.), 1997.

"Property–Based Testing; A New Approach to Testing for Assurance", FInk et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems 9(2).*, (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering of TCP Code: Vulnerability Analysis and Proposed Solutions, Guha et al., *Proc. of the IEEE Infocom '96*, San Francisco, CA (found at http://seclab.cs.ucdavis.edu/papers.html.), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security–Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering*, vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology—Eurocrypt '96*, LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19th NISCC*. 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

"A Standard Audit Trail Format", Matt Bishop, *Proc. of the 1995 NISSC*, Baltimore, MD., (found at http://seclab.cs.ucdavis.edu/papers.html), 1995.

Abstract entitled Theft of Information in the Take–Grant Protection Model, Matt Bishop, *Journal of Computer Security, vol. 3, No. 4*, (found at http://seclab.cs.ucdavis.edu/papers.html), 1995.

"Improving System Security via Proactive Password Checking", Matt Bishop,*Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC*, Baltimore, MD, 11 pagtes, (found at http://seclab.cs.ucdavis.edu/papers.html), 1995.

"Network Security Monitor", L. Todd Heberlein, *Lawrence Livermore National Laboratory project deliverable*, (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, no. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95*, (found at http://seclab.cs.ucdavis.edu/papers.html), 1995.

"Provably Secure Session Key Distribution–The Three Party Case", Bellare et al., *Proc. of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html), Oct. 1995.

"Holding Intruders Accountable on the Internet", Staniford–Chen et al., *Proc. of the 1995 IEEE Symposium on Security and Privacy*, Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium*. 10 pages, (found at http://seclab.cs.ucdavis.edu/papers.html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html), Dec. 1994.

"Arificial Intelligence and Intrusion Detection: Current and Future Directions", Jeremy Frank,*Proc. of the 17th National Computer Security Conference*. 12 pages, (found at http://seclab.cs.ucdavis.edu/papers.html), 1994.

"Automated Detection of Vulnerabilities in Privileged Programs by Execution Monitoring", Ko et al.,*Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html), 1994.

"Network Instrustion Detection", Mukherjee et al., *IEEE Network*, May–Jun. 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94*, 20 pages, (found at http://seclab.cs.ucdavis.edu/papers.html), 1994.

"The Security of Cipher Block Chaining", Bellare et al., *Advances in Cryptology—CRYPTO '94*, Santa Barbara CA. (19 pages) (found at http://seclab.cs.ucdavis.edu/papers.html), 1994.

"Analysis Of An Algorithm For Distributed Recognition And Accountability", Ko et al., *Proc. 1st ACM Conference on Computer and Communication Security*. VA, Nov. 1993, 11 pages, (found at http://seclab.cs.ucdavis.edu/papers.html), 1993.

Abstract entitled "An Extendable Password Checker" by M. Bishop, *Proc, UNIX Security II* Portland, OR, Aug. 27–28, 1990, pp. 15–16, (found at http://seclab,cs.ucdavis.edu/papers.html).

Abstract entitle "A Security Analysis of the NTP Protocol Version 2" by M. Bishop.

Abstract entitled "A Little Knowledge Goes a Long Way: Faster Detection of Compromised Data in 2–D Tables" by D. Gusfield, *Proc. of the 1990 IEEE Symposium on Research in Security and Privacy*, Oakland, CA, May 7–9, 1990, pp. 86–94, (found at http://seclab.cs.ucdavis.edu/papers.html).

Abstract entitled "A Network Security Monitor" by L.T. Heberlein, G.V. Dias, K.N. Levitt, B. Mukherjee and others, *Proc. of the 1990 IEE Symposium on Research in Security and Privacy*, Oakland, CA, May 7–9, 1990, pp. 296–304, (found at http:// seclab.cs.ucdavis.edu/papers.html).

"Entity Authentication and Key Distribution". Bellare et al., *Advances in Cryptology—CRYPTO '93*, Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., *Proc. of the 1st ACM Conference on Computer and Communications Security*, Fairfax, VA, Nov. 1993, pp. 1545–164. (found at http://seclab.cs.ucdavis.edu/papers.html), 1993.

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)—Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html), May 1990.

Abstract entitled "Static Analysis Virus Detection Tools for UNIX Systems" by P. Kerchen, et al., *Proc. 13th National Computer Security Conference*, Washington DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology–CRYPTO '90*, Santa Barbara, CA, Aug. 11–15, 1990, pp. 62–76, (found at http://seclab.cs.ucdavis.edu/papers.html).

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers.html).

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–135. (found at http://seclab.cs.ucdavis.edu/papers.html).

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html).

Abstract entitled "Password Management" by M. Bishop, *COMPCON Spring '91. Digest of Papers*. San Francisco, CA, Feb. 25–Mar. 1, 1991, pp. 167–169. (found at http://seclab.cs.ucdavis.edu/papers.html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers.html).

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2.

NetRanger 1.3 User's Guide, Copyright © 1997 by Wheel-Group Corporation, NetRanger product first available summer of 1996.

"Information Security and Privacy in Network Environments," by U.S. Office of Technology Assessment, OTA–TCT–606 (Washington DC: US Government Printing Office). Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, © 1990.

* cited by examiner

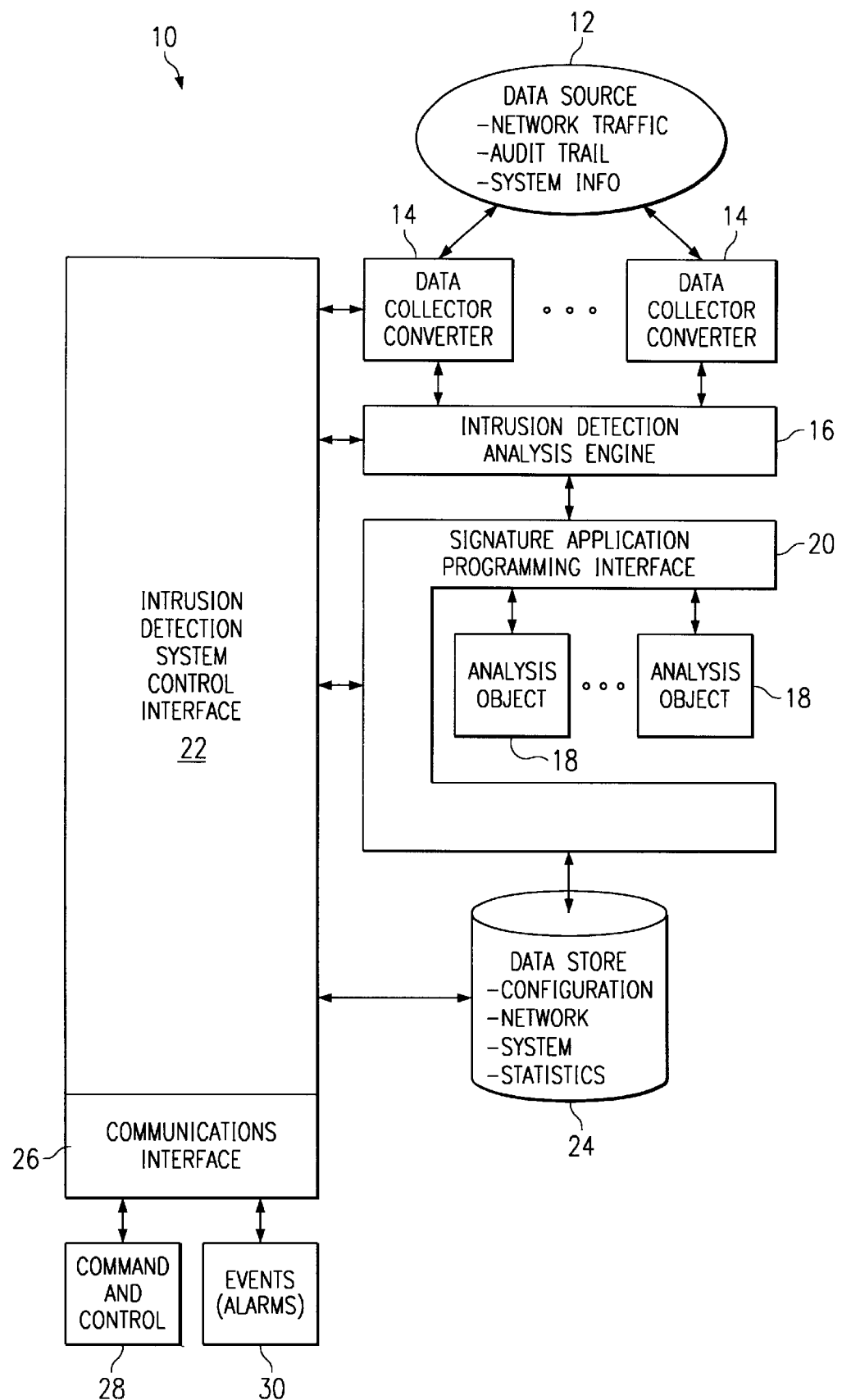

INTRUSION DETECTION SYSTEM AND METHOD HAVING DYNAMICALLY LOADED SIGNATURES

RELATED APPLICATION

This application is a continuation of U.S. patent application Ser. No. 09/227,987 filed Jan. 8, 1999 now U.S. Pat. No. 6,477,651 entitled "Intrusion Detection System And Method Having Dynamically Loaded Signatures".

TECHNICAL FIELD OF THE INVENTION

This invention relates in general to the field of computer networks, and more particularly to an intrusion detection system and method having dynamically loaded signatures.

BACKGROUND OF THE INVENTION

Computer networks have become increasingly important means for communicating public and private information between and within distributed locations. The Internet is one example of a public network commonly used for communicating public and private information. Internet web servers provide access to public information, such as news, business information and government information, which the Internet makes readily available around the world. The Internet is also becoming a popular forum for business transactions, including securities transactions and sales of goods and services. A large number of people have come to depend upon reliable Internet access and secure communications on a day by day and even second by second basis. Like the Internet, private networks also have become common means for communicating important information. Private networks, such as company intranets, local area networks (LANs), and wide area networks (WANs) generally limit access on a user by user basis and communicate data over dedicated lines or by controlling access through passwords, encryption or other security measures.

One danger to reliable and secure network communications is posed by hackers or other unauthorized users disrupting or interfering with network resources. The danger posed by unauthorized access to computer network resources can vary from simple embarrassment to substantial financial losses. For instance, hackers recently attacked a prominent newspaper web site, disabling the web site and causing the newspaper substantial embarrassment. More serious financial disruptions occur when hackers obtain financial account information or credit card information and use that information to misappropriate funds.

Typically, network administrators use various levels of security measures to protect the network against unauthorized use. Hackers, on the other hand, attempt to find and attack vulnerabilities of the security measures and network devices in order to obtain unauthorized entry to the computer network. Although sophisticated security measures can provide significant barriers to hackers, virtually any security measure can be breached through a vulnerability with enough effort.

Intrusion detection systems are commonly used in networks to detect and identify unauthorized use of the computer network before the network resources and information are substantially disrupted or violated. In general, intrusion detection systems look for specific patterns in network traffic, audit trails, and other data sources to detect malicious activity. Conventional intrusion detection systems often identify patterns, also known as signatures, by analyzing network data with various implementations for identifying the patterns, such as finite state machines, simple pattern matching, or specialized algorithms. Typically, implementations for identifying malicious activity patterns are hard coded as part of the binary code that executes to monitor network data for predetermined patterns and reports detected patterns to network administration.

Conventional intrusion detection systems have a number of difficulties. One significant difficulty is that when a new vulnerability, or type of attack on the network, is discovered, a new signature generally must be incorporated into the software, compiled and redistributed to the intrusion detection systems. Thus, upgrading an intrusion detection system to address a new vulnerability generally requires an entire new compiled binary code. Replacing or modifying the binary code is expensive and time consuming. Further, as binary code becomes longer and more complex, performance of the intrusion detection system may suffer.

Another difficulty with conventional intrusion detection systems is that, when new code is introduced, the intrusion detection system generally must be shut down. However, networks, especially in the corporate environment, usually remain available on a continuous basis. Thus, if an attacker launches an attack against a defended network when the intrusion detection system is turned off for a maintenance upgrade, significant damage can occur.

Another difficulty with conventional intrusion detection systems is the difficulty in modifying the systems to support individualized network needs. For instance, many networks use home-grown application level protocols for specific client server applications, such as user authentication. In order for conventional intrusion detection systems to support such individualized network systems, system-specific binary code must be written and implemented. This process is expensive and time consuming, and typically requires testing of a complete system even when only minor changes are made for adapting the system to a user specific network application. Further, in order to modify an intrusion detection system's binary code, programmers need access to the entire source code, which can result in unnecessary disclosure of proprietary elements of an intrusion detection system to outside programmers.

SUMMARY OF THE INVENTION

Therefore, a need has arisen for a method and system which simplifies the modification of intrusion detection systems to adapt to new network vulnerabilities.

A further need exists for a method and system which supports upgrades to an intrusion detection system in a dynamic manner without shutting down the intrusion detection system.

A further need exists for a method and system which supports upgrades to intrusion detection systems to protect network-specific applications.

In accordance with the present invention, an intrusion detection system and method having dynamically loaded signatures are provided that substantially eliminate or reduce disadvantages and problems associated with previously developed intrusion detection system and methods. An intrusion detection analysis engine instanciates an analysis object using network data. An attack on the network is detected with the instance of the analysis object.

More specifically, network vulnerabilities are identified that could allow an attack on a network. Signatures associated with each network vulnerability are determined by investigating specific patterns of network data associated with an attack on the vulnerability. An analysis object is created for analyzing network data to detect the signature associated with the network vulnerability.

An intrusion detection analysis engine accepts network data from a data collector converter. The intrusion detection analysis engine interfaces with the analysis object through an application programming interface to instanciate the analysis object with the network data. The instance of the analysis object enables the intrusion detection analysis engine to determine whether a signature associated with the network vulnerability exists. If the instance of the analysis object determines that the signature exists, then the intrusion detection system alerts the network of a potential attack.

In one embodiment, the analysis object is dynamically provided to interface with the intrusion detection analysis engine by using the application programming interface. For instance, the analysis object is precompiled into machine language and interfaced with the intrusion detection analysis engine during operation of the intrusion detection analysis engine. In this manner, when a new vulnerability of a network is determined, a new analysis object is created to support detection of a signature associated with the new vulnerability. The new analysis object is interfaced with the intrusion detection analysis engine using the application programming interface on a runtime basis, allowing the intrusion detection analysis engine to detect attacks on the new vulnerability without shutting down the intrusion detection analysis engine.

The present invention provides a number of important technical advantages. One important technical advantage is that the intrusion detection system remains running while new signatures are loaded. This allows continuous monitoring of the network and enhanced reliability for preventing attacks on the network.

Another important technical advantage of the present invention is that each network vulnerability may have an analysis object specifically directed towards detecting attacks for that particular vulnerability. Thus, analysis objects can be loaded as plug-ins as needed for particular networks. Thus, for instance, an intrusion detection system can have specific analysis objects for protecting home-grown application level protocols for specific client server applications such as user authentication. Also, advantageously, performance impacts are minimized as new analysis objects are added. Further, by dynamically loading and unloading specific analysis objects, the present invention reduces the need for modifying entire intrusion detection system binary code as new vulnerabilities are determined.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

The FIGURE depicts a block diagram of one embodiment of an intrusion detection system having dynamically loaded signatures implemented with analysis objects.

DETAILED DESCRIPTION OF THE INVENTION

Detection of attacks on a network often amounts to a cat and mouse game of electronic warfare in a rapidly changing environment. Hackers are quite creative in their search for vulnerabilities that will allow them to obtain unauthorized access to a computer network, often for malicious purposes. One key goal of hackers is to obtain access to networks without detection. Although a creative hacker is difficult to detect in an established network environment, the difficulty of detecting a hacker is compounded by the rapid growth in the number and types of networks coming online. Network administrators must be flexible to respond to attacks by hackers in an effective manner. The present invention supports rapid response to network vulnerabilities through an object-oriented implementation of dynamically loaded signatures.

The FIGURE depicts a block diagram of one embodiment of an intrusion detection system having dynamically loaded signatures implemented with an analysis object. The intrusion detection system 10 of the FIGURE allows monitoring of network data to detect attacks on a network. If an attack is detected on the network, intrusion detection system 10 provides notice of the attack to a network administrator, allowing the administrator to respond to the attack. Intrusion detection system 10 supports 7-day a week, 24-hour a day, 365-day a year level of operations to maintain a highly reliable network environment.

As shown, intrusion detection system 10 accepts network data from a data source 12. One or more data collector converters 14 collect the network data and convert the network data into predetermined formats for analysis. Data source 12 can include network routers and servers that provide network traffic data, audit trail data, system information data, and other data sources. In one embodiment, a data collector converter 14 is used for each type of network data collected from the network. For instance, a separate data collector converter 14 can be used for collecting and converting network traffic data, audit trail data, and system information data.

An intrusion detection analysis engine 16 interfaces with the one or more data collector converters 14 to accept the network data and analyze the network data for malicious or unauthorized use of network resources. Intrusion detection analysis engine 16 analyzes network data to look for specific patterns that indicate malicious activity on the network. These patterns, known as signatures, are generally unique to each type of vulnerability of the network. In the illustrated embodiment, intrusion detection analysis engine 16 performs this analysis using one or more analysis objects 18 and interfaces with the one or more analysis objects 18 through a signature application programming interface (API) 20. Each analysis object 18 provides dynamically loadable and unloadable executable code for identification of a signature associated with an attack on a network vulnerability. In addition, signature application programming interface 20 allows the distribution of a signature development kit to third party developers for creating analysis objects 18 that can interface to intrusion detection analysis engine 16.

An intrusion detection system control interface 22 communicates with data collector converters 14, intrusion detection analysis engine 16, signature development kit API 20, and a data store 24 to support user inputs and to provide system outputs to a user. A communications interface 26 accepts command and control instructions from a command and control module 28 and provides events, such as alarms indicating malicious or unauthorized use of the network, to an events module 30. Data store 24 stores configuration, network, system and statistics information relating to intrusion detection system 10.

In operation, intrusion detection analysis engine 16 accepts network data from data collector converter 14 and communicates with one or more analysis objects 18 through signature API 20 to determine whether the network is experiencing an attack. Intrusion detection analysis engine 16 instanciates analysis object 18 with network data provided by data collector converter 14 and with any other parameters needed by analysis objects 18 to perform the respective analysis. The instance of analysis object 18 generated by intrusion detection analysis engine 16 allows intrusion detection analysis engine 16 to determine whether a signature associated with analysis object 18 exists in the network data. If the instance of analysis object 18 indicates the existence of a signature or other analyzed event, intrusion detection analysis engine 16 communicates an alarm through intrusion detection system control interface 22 and communications interface 26 to events module 30.

If a new vulnerability of the network is found, a new analysis object 18 can be developed to detect a signature associated with the new vulnerability. A user at command and control module 28 can then implement the new analysis object by communicating with signature API 20 through intrusion detection system control interface 22. The signature of the new vulnerability can be implemented as an analysis object with shared libraries under UNIX or with DLLs under WINDOWS NT, 95, 98, etc. The new analysis object 18 can be precompiled into binary code and interfaced with intrusion detection analysis engine 16 dynamically, on a runtime basis, so that intrusion detection system 10 remains online to detect attacks on the network during the development and interfacing of the new analysis object 18.

In addition to allowing dynamic runtime creation and interfacing of a new analysis object 18, signature API 20 also supports user-specific implementations of analysis objects 18. For instance, home-grown application level protocols for specific client server applications, such as user authentication protocols, can be protected on a network by network basis. Due to the ability to dynamically load analysis object 18, the addition of analysis objects to an intrusion detection system 10 generally does not require modification to intrusion detection analysis engine 16. Thus, a network administrator can design and implement an intrusion detection system 10 that addresses specific network needs on a vulnerability by vulnerability basis.

When intrusion detection analysis engine 16 is first initialized, it scans the directory of data store 24 to locate analysis objects of intrusion detection system 10. The analysis objects are then interfaced with intrusion detection analysis engine 16 by signature development kit API 20. In one implementation, intrusion detection analysis engine 16 and the analysis objects 18 compare versions and settle upon a common application programming interface version. A cryptographic exchange is then conducted to ensure that analysis objects 18 are legitimate and licensed. Each analysis object 18 then updates data store 24 for configuration items, including default values. Intrusion detection analysis engine 16 then queries each analysis object 18 to determine the type of data required for analysis. Intrusion detection analysis engine 16 also queries analysis object 18 to determine timer values for asynchronous processing if needed. When analysis objects 18 have been interfaced with intrusion detection analysis engine 16, intrusion detection analysis engine 16 processes the configuration file of data store 24. The configuration information found within configuration file of data store 24 may override default configurations of each analysis object 18. Further, configuration may occur during operation of intrusion detection system 10 through command and control module 28.

Although the present invention has been described in detail, it should be understood that various changes, substitutions and alterations can be made hereto without departing from the spirit and scope of the invention as defined by the appended claims.

What is claimed is:

1. An apparatus for detecting an attack on a network, comprising:
    logic encoded in media and operable to:
        provide network data to an intrusion detection analysis engine;
        instanciate an analysis object with the network data;
        pre-compile the analysis object;
        dynamically interface the analysis object with the intrusion detection analysis engine on a runtime basis; and
        detect an attack on the network with the instance of the analysis object.

2. The apparatus of claim 1, the logic further operable to dynamically interface additional analysis objects with the intrusion detection analysis engine through an application programming interface.

3. The apparatus of claim 2, wherein each analysis object detects a predetermined signature associated with an attack on a predetermined network vulnerability.

4. The apparatus of claim 3, the logic further operable to:
    determine a new network vulnerability;
    create a new analysis object for detecting a signature associated with the new network vulnerability; and
    dynamically interface the new analysis object with the intrusion detection analysis engine.

5. An apparatus for detecting unauthorized use of a network comprising:
    logic encoded in media and operable to:
        determine a signature associated with an attack on a network vulnerability;
        create an analysis object, the analysis object for analyzing network data to detect the signature;
        dynamically provide the analysis object to an intrusion detection system through an application programming interface; and
        detect an attack on the network vulnerability with the intrusion detection system using the analysis object to detect the signature.

6. The apparatus of claim 5, wherein the network data comprises network traffic data.

7. The apparatus of claim 5, wherein the network data comprises audit trail data.

8. The apparatus of claim 5, wherein the network data comprises system information data.

9. The apparatus of claim 5, wherein the logic operable to dynamically provide the analysis object to an intrusion detection system through an application programming interface comprises the logic operable to pre-compile the analysis object into binary code and provide the analysis object to the intrusion detection system while the intrusion detection system is operating.

10. The apparatus of claim 5, the logic further operable to generate an alarm when an attack is detected.

11. An apparatus for detecting an attack on a network, comprising:
    logic encoded in media and operable to:
        collect network data;
        provide the network data to an intrusion detection system;
        dynamically interface the intrusion detection system with an analysis object using an application programming interface; and
        detect an attack on the network with the intrusion detection system and the analysis object.

12. The apparatus of claim 11, wherein the analysis object detects a signature associated with an attack on a predetermined network vulnerability.

13. The apparatus of claim 11, wherein the logic operable to interface step further comprises the logic operable to interface the intrusion detection system with plural analysis objects, each analysis object for detecting a predetermined signature associated with a predetermined attack on the network.

14. The apparatus of claim 13, wherein the network data comprises network traffic data.

15. The apparatus of claim 13, wherein the network data comprises audit trail data.

16. The apparatus of claim 13, wherein the network data comprises system information data.

17. The apparatus of claim 11, the logic further operable to:

determine a network vulnerability;

create a new analysis object for detecting an attack on the new network vulnerability;

use the application programming interface to dynamically interface the new analysis object with the intrusion detection system; and detect an attack on the new network vulnerability with the intrusion detection system and the new analysis object.

18. The apparatus of claim 11, wherein the logic operable to use the application programming interface step comprises the logic operable to:

pre-compile the new analysis object into binary code; and dynamically interface the new analysis object with the intrusion detection system at runtime.

19. An intrusion detection system for detecting unauthorized use of a network comprising:

a first analysis object for identifying a first signature in network data, the first signature associated with an attack on a network vulnerability;

an intrusion detection analysis engine interfaced with the network to accept network data, and interfaced with the first analysis object, the intrusion detection analysis engine operable to instanciate the first analysis object with network data and to use the instance of the first analysis object to detect an attack on the network; and an analysis object engine operable to receive configuration data, automatically create a second analysis object based, at least in part, on a second signature substantially defined by the configuration data, and dynamically interface the second analysis object with the intrusion detection analysis engine on a runtime basis.

20. The system of claim 19 further comprising a data collector converter operable to collect the network data and communicate the network data to the intrusion detection analysis engine.

21. The system of claim 20, wherein the data collector converter is further operable to convert the network data into predetermined formats.

22. The system of claim 19 further comprising an output module operable to generate an alarm in response to an attack on the network.

23. The system of claim 19 further comprising a data store operable to store at least one analysis object and a configuration file, the configuration file comprising the configuration data.

24. The system of claim 19, wherein the analysis object engine is further operable to revise the instance of the first analysis object based, at least in part, on the configuration data.

25. A method for detecting unauthorized use of a network, comprising:

receiving configuration data;

automatically creating an analysis object based, at least in part, on a signature substantially defined by the configuration data;

receiving network data;

instanciating the analysis object with the network data; and dynamically interfacing the instance of the analysis object with an intrusion detection analysis engine on a runtime basis, the intrusion detection analysis engine detecting an attack on the network with the instance of the analysis object.

26. The method of claim 25 further comprising:

collecting the network data; and communicating the network data to the intrusion detection analysis engine.

27. The method of claim 26 further comprising converting the network data into predetermined formats.

28. The method of claim 25 further comprising generating an alarm in response to an attack on the network.

29. The method of claim 25 further comprising storing at least one analysis object and a configuration file, the configuration file comprising the configuration data.

30. The method of claim 25 further comprising revising the instance of the analysis object based, at least in part, on the configuration data.

31. An apparatus for detecting unauthorized use of a network, comprising:

logic encoded in media and operable to:

receive configuration data;

automatically create an analysis object based, at least in part, on a signature substantially defined by the configuration data;

receive network data;

instanciate the analysis object with the network data; and dynamically interface the instance of the analysis object with an intrusion detection analysis engine on a runtime basis, the intrusion detection analysis engine detecting an attack on the network with the instance of the analysis object.

32. The apparatus of claim 31, the logic further operable to:

collect the network data; and communicate the network data to the intrusion detection analysis engine.

33. The apparatus of claim 32, the logic further operable to convert the network data into predetermined formats.

34. The apparatus of claim 31, the logic further operable to generate an alarm in response to an attack on the network.

35. The apparatus of claim 31, the logic further operable to store at least one analysis object and a configuration file, the configuration file comprising the configuration data.

36. The logic apparatus of claim 31, the logic further operable to revise the instance of the analysis object based, at least in part, on the configuration data.

37. A system for detecting unauthorized use of a network, comprising:

means for determining a signature associated with an attack on a network vulnerability;

means for creating an analysis object, the analysis object for analyzing network data to detect the signature;

means for dynamically providing the analysis object to an intrusion detection system through an application programming interface; and means for detecting an attack on the network vulnerability with the intrusion detection system using the analysis object to detect the signature.

* * * * *